SELECTIVE-FREQUENCY POWERLINE LOAD CONTROL

Filed May 9, 1966

INVENTOR
KONRAD DINTER

BY Alexander & Dowell
ATTORNEYS

INVENTOR
KONRAD DINTER

BY Alexander & Dowell
ATTORNEYS

United States Patent Office 3,448,361

Patented June 3, 1969

3,448,361

SELECTIVE-FREQUENCY POWERLINE LOAD CONTROL

Konrad Dinter, 23 Oppelner Strasse, 69 Heidelberg-Kirchheim, Germany

Filed May 9, 1966, Ser. No. 548,624

Claims priority, application Germany, May 28, 1965, D 47,383

Int. Cl. H02p *1/54, 5/46, 7/68*

U.S. Cl. 318—55 6 Claims

ABSTRACT OF THE DISCLOSURE

A system selectively using different frequencies to individually control different loads coupled to a powerline, or for controlling loads attached to different sections of a powerline which are similarly and separately controllable, the system using control frequency discriminating filters which have a tendency to continue to ring after the control voltages exciting them have been removed, and therefore means are provided for delaying the rise of a new half cycle of the powerline voltage after it passes through zero for an interval sufficient to allow the ringing of the filters to die out. The system also includes several new ways to employ SCR's with filters to control a load connected to a powerline.

This invention relates to circuitry for selectively controlling the consumption of energy by one or more discrete loads supplied by a common power line, but wherein no additional control wires extend from the control center to the various loads. This improvement is especially useful for extending selective control to already-existing installations without adding extra control wiring. It is also useful for the selective control of one or more motorized devices or vehicles travelling along trackways.

The present invention teaches the use of semi-conductor controlled rectifier means (SCR) to control the flow of energy in remote loads, the various SCR's being selectively controlled by carrier currents of different frequencies, and the carrier currents being superimposed on the power line. The main power on the line must have a periodic voltage characteristic which either alternates or periodically goes to zero potential so that the SCR's are periodically extinguished. The improved circuitry includes suitable decoupling network means at the power feeding point to separate the control frequencies from the power source, and further includes at each separate load suitable resonant filter means tuned to the specific carrier-current control frequency intended to control the flow of power to that load. The carrier current through each filter develops a voltage which triggers the associated SCR "on," provided the filter is resonant to the control current frequency applied at that moment. Each time the SCR is extinguished by reversal of the power line polarity, it can be triggered "on" again as soon as suitable polarity is resumed and so long as the appropriate control current remains present at the associated filter.

It is the object of this invention to provide novel control circuitry of the above type.

Referring now to the drawings.

Figures 1, 2:
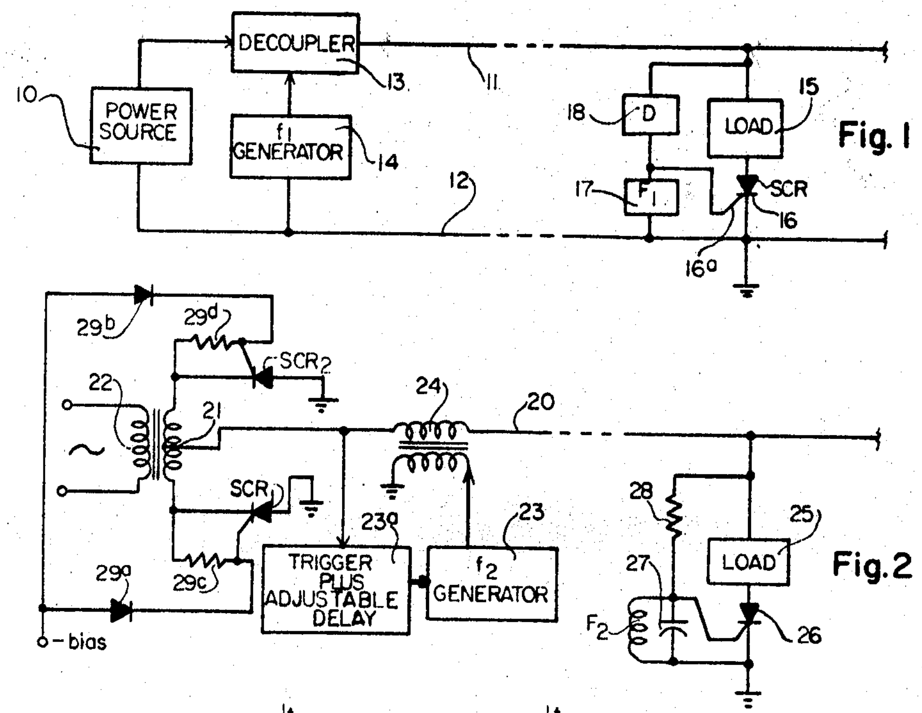
FIG. 1 is a block diagram illustrating the simplest form of the invention.
FIG. 2 is a schematic diagram of a preferred embodiment.

In FIG. 1, a power source 10 supplies the power lines 11, 12 with alternating or pulsating power which at least reaches zero potential at periodic intervals, and which in the usual case actually reverses polarity. A decoupler network 13 serves to permit introduction of one or more control currents onto the lines 11, 12 from generator means 14 without having the power source 10 and the generator means 14 short-circuit each other. The load 15 is coupled in series with the SCR 16 and across the power lines 11, 12, the SCR 16 having a control electrode **16*a* which is triggered "on" by the control voltage from the generator 14 appearing across the filter 17 when its frequency $F_1$ is resonant at the frequency $f_1$. It is to be understood that a practical system would include plural generators 14, and plural load circuits with filters 17 tuned to different frequencies $f_1$. A decoupling means 18 such as a resistor connects the filter 17 to be driven by carrier currents from the line 11**.

In the event that A.C. power is used directly from the power line mains, or is transformed to a voltage other than the supply voltage, then the circuit in its simplest form would be supplied with energy less than half of the time because the SCR 16 can only conduct in one polarity direction. This shortening of the duty cycle can be compensated for by raising the voltage, or by using another SCR in the load circuit for coupling the load to the power line in such a way as to pass current through it in the opposite direction during the half cycles which would ordinarily be blocked by the use of a single SCR. However, where another SCR is used at each load, a second resonant filter would also have to be used to control the additional SCR.

Figure 3:
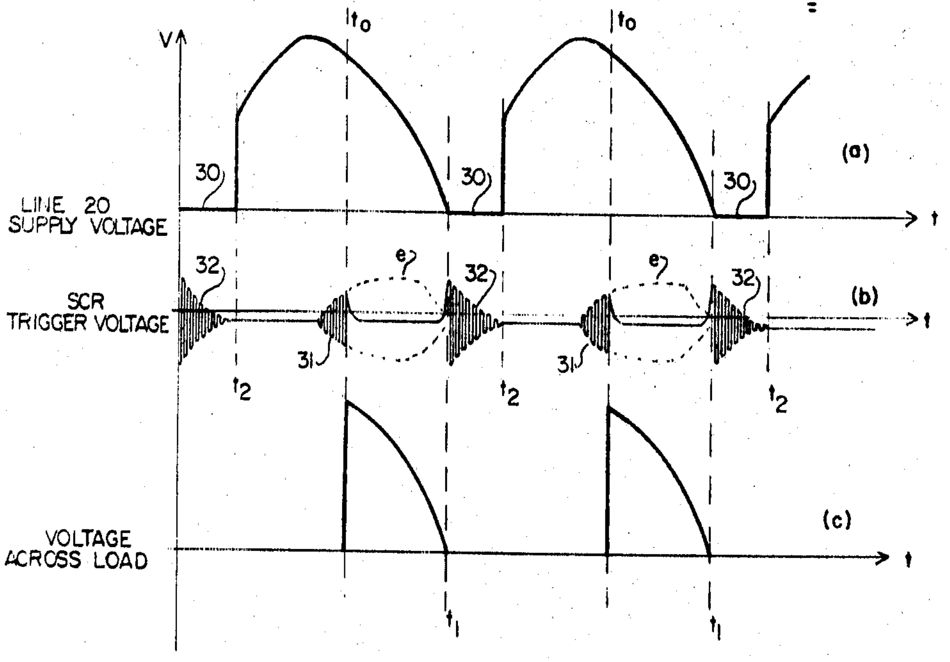
FIG. 3 is a diagram of waveforms encountered in FIG. 2.

It is possible to save the second rectifier circuit at each load by supplying direct current to the power line from full wave rectifier means, as shown in FIG. 2. In this circuit, the power line 20 is supplied through two SCR's, labeled $SCR_1$ and $SCR_2$ which are connected with the secondary winding 21 of a transformer which derives its power in the primary winding 22 from the alternating current power lines. The control frequency generator 23 is coupled to the D.C. line 20 through a transformer 24. The combination of units drives and controls one or more load circuits, of which the load 25 is typical. The SCR 26 controls the flow of current through the load 25, and is triggered "on" by voltage appearing across the filter 27 whenever its resonant frequency $F_2$ matches the frequency $f_2$ of the generator 23. The resistance 28 serves to couple the tuned circuit 27 to the power line 20. The power line 20 does not carry pure D.C., but carries pulsating D.C. as shown in FIG. 3(*a*).

Whether the load is supplied directly from the A.C. lines as shown in FIG. 1, or from rectified D.C. lines as shown in FIG. 2, a difficulty arises because of the fact that the load-controlling SCR 16 or 26 will tend to trigger immediately after the waveform of the supply line goes through zero and begins rising again. Although the SCR's are extinguished when the waveform goes to zero, the tuned filters 17 or 27 tend to be shock-excited thereby, and to ring at their resonant frequencies, thereby triggering the SCR's even in the absence of applied control current. Although the tuned circuits can be adjusted so as to decrease their Q's, such a decrease is undesirable first, because broader-tuned filters would require a larger range of control frequencies in order to control a plurality of load circuits thereby extending the entire frequency band needed for control purposes, and second, the broader the tuning of the filter the wider the spectrum of transients which may cause it to ring and falsely trigger the SCR's.

It is therefore a further improved feature of the present invention to provide means for suppressing the first portion of each half cycle on the power line 20 in the circuit according to FIG. 2, for instance for about 10% of the duration of the half cycle. Therefore, $SCR_1$ and $SCR_2$ are used as the main rectifiers instead of ordinary diodes, and their control electrodes are normally reverse-biased through diodes **29*a* and 29*b* so that the voltages at the outer ends of the winding 21 will have to exceed the negative bias applied through the diodes 29*a* and 29*b* before the control electrodes of the SCR's can be triggered through the respective resistors 29*c* and 29*d*. This accounts for the zero voltage intervals labeled 30** in FIG. 3(*a*). The voltage characteristics shown in the waveform in FIG. 3(*b*) includes the desired filter output bursts 31, and the undesired bursts 32 caused by ringing of the filters as a result of the shock of the voltage on line 20 passing through zero. In other words, by having the voltage on the power line 20 remain at zero for the time interval 30, the triggering oscillations of the undesired bursts 32 are allowed time to dissipate before any voltage is placed across the load-control SCR 26. In the event that an A.C. voltage is used on the power lines 11, 12 as in FIG. 1, and further that this figure is modified to provide two oppositely-poled SCR's supplying power from the source 10 to the power lines 11, 12, then these two SCR's can be provided with bias and diodes as suggested for $SCR_1$ and $SCR_2$ in FIG. 2 in order to provide delayed conduction from the source 10 to the power lines 11, 12. However, where conservation of power is desired, the rectified power line system shown in FIG. 2 is preferable.

Referring again to FIG. 3, it will be noted that the desired control voltage 31 in curve (*b*) does not follow the envelope *e* shown in dotted lines because it is short-circuited by the SCR 26 as soon as the voltage 31 reaches a value great enough to cause the control electrode to conduct, the maxima of the envelope *e* otherwise being determined by the Q of the tuned circuit 27. Thus the filter's ringing voltage rises until the moment $t_0$ when the SCR fires. At the moment $t_1$ the supply voltage reaches zero and thereby causes the filter to be shocked into ringing again at its resonant frequency, as shown at 32. Thus from $t_1$ to $t_2$ when the ringing 32 has about died out, the line voltage is held at zero as at 30. FIG. 3(*c*) shows the power being supplied to the load after time $t_0$ and until the SCR is again extinguished at time $t_1$. It is intended that the time $t_0$ be a variable which can be moved back and forth between time $t_2$ and time $t_1$ in order to vary the average power supplied to the load, and therefore the generator 23 should be periodically rendered operative by a trigger circuit **23*a* which is itself triggered every half cycle from the power line, but whose output to the generator 23** can be selectively delayed after time $t_2$ to a selected time $t_0$.

The parallel tuned circuit 27 is quite satisfactory as the control filter which selectively triggers the load SCR, and the Q of this tuned circuit should be made as high as possible at the resonant frequency so that relatively high peak voltages appear across the filter in order to control the SCR while drawing a minimum amount of control current from the power line. However, a further improvement can be had by using magnetostrictive or piezoelectric resonant filter means which are not only very sensitive to their resonant frequencies but which also comprise very simple units, thereby reducing the number of necessary components at each load circuit to three, namely: the SCR, the decoupling resistor, and the filter.

Figure 4:
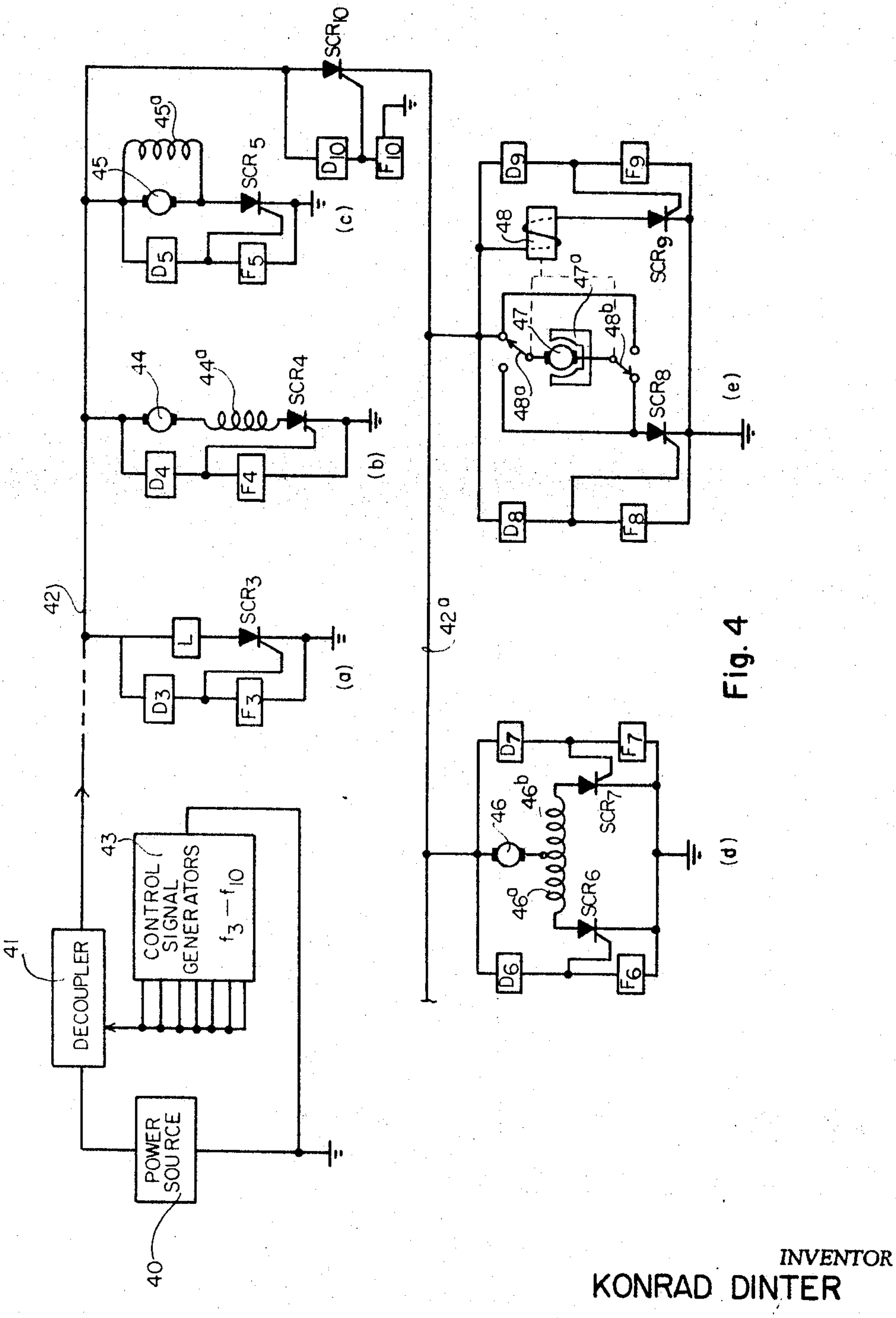
FIG. 4 is a block diagram showing five different remote units controlled from a common control center.

FIG. 4 shows a power source 40 which can be either of the type shown in FIG. 1 or in FIG. 2, this power source being connected through suitable decoupling network means 41 to a power line 42 which feeds a plurality of different load circuits labeled respectively (*a*), (*b*), (*c*), (*d*) and (*e*). There are nine different filters in the various load circuits, and therefore a control signal generator 43 is shown which is capable of selectively putting out a number of different control frequencies $F_3$ through $F_{10}$ inclusive. The five load circuits are illustrative embodiments, wherein the load circuit in FIG. 4(*e*) is similar to that shown in FIG. 1 or FIG. 2, and comprises any kind of load L in series with $SCR_3$ which is in turn controlled by voltage appearing across the filter $F_3$ as supplied to it through the decoupling device $D_3$. The showing in FIG. 4(*b*) includes a series motor 44 having a field winding **44*a***, and under the control of $SCR_4$ which is in turn triggered by the filter $F_4$ supplied with energy through the decoupler $D_4$. FIG. 4(*c*) is similar to (*b*) except that motor 45 is a shunt motor having its field **45*a*** connected across the armature. However, $SCR_5$, $F_5$ and $D_5$ perform in the same way as the corresponding components shown in load circuits (*a*) and (*b*). The load circuit in FIG. 4(*d*) shows a series motor 46 having two field windings connected in series with the armature at their center tap, these windings being labeled **46*a* and 46*b*. At any particular time, only $SCR_6$ or $SCR_7$ is operative, depending on whether the generator 43** is transmitting frequency $f_6$ or $f_7$. The motor therefore is reversible and can be operated in either direction by energizing either the filter $F_6$ or the filter $F_7$ through their respective decoupling means $D_6$ or $D_7$. Finally, the circuit shown in FIG. 4(*e*) comprises a permanent magnet motor 47 having field magnets **47(*a*), the direction of rotation of the motor being controlled by a relay 48 including reversing contacts 48*a* and 48*b*. When the relay winding is unenergized, the motor armature will be connected with one polarity to the power line and will be operated when $SCR_8$ is rendered conductive by a frequency $f_8$ energizing the filter $F_8$ through the decoupler $D_8$. On the other hand if frequency $f_9$ is also present, $SCR_9$ will also be energized to keep the relay 48** closed so as to reverse the connection of the armature across the line. Thus, the motor will run in the opposite direction when both $SCR_9$ and $SCR_8$ are energized by the combined presence of $f_9$ and $f_8$.

It is to be understood that the power lines themselves can be divided into different sections, each of which can then be separately controlled by the application of proper control frequencies, the different sections of the power lines being isolated by SCR's such as $SCR_{10}$ which are controlled by suitable blocking filters such as $F_{10}$ so that the loads coupled to the controlled line section **42*a* can be actuated only if frequency $f_{10}$ is delivered by the generator 43**.

The invention is not to be limited to the specific embodiments illustrated but only by the accompanying claims.

I claim:

1. Apparatus for selectively controlling the consumption of power from a powerline by plural discrete loads coupled thereto, comprising:

(a) an A.C. power source;

(b) rectifier means connecting the powerline to the source and including control electrode means to render the rectifier means conductive after the A.C. goes through zero voltage;

(c) semiconductor controlled rectifier (SCR) means interposed between each controlled load and the powerline, and having a gating electrode for rendering the SCR means conductive;

(d) filter means coupling each gating electrode to the powerline and at least some thereof having resonant ring times when excited;

(e) means for selectively applying to the powerline one or more control frequencies selected to excite said filter means; and (f) means for back-biasing said control electrode means of said rectifier means to delay conduction of the latter for an interval approximating said ring times after the A.C. voltage goes through zero.

2. In apparatus as set forth in claim 1, full-wave rectifier means connecting the power line to the source, and said means for applying control frequencies to the line including means for generating the frequencies once during each half-wave rectified period.

3. In apparatus as set forth in claim 1, said filter means each comprising a magnetostrictive filter.

4. In apparatus as set forth in claim 1, said filter means each comprising a piezoelectric filter.

5. In apparatus as set forth in claim 1 wherein the load comprises a motor having a main current conducting circuit, relay means reversibly connecting the main circuit to the power line, first semiconductor controlled rectifier means interposed in the motor circuit to control the flow of power thereto, and second semiconductor controlled rectifier means connecting the relay means to the power line to control the energization of the relay means, and separate filter means turned to different control frequencies and connected respectively to the control electrodes of the first and second rectifier means.

6. In apparatus as set forth in claim 1, said plural discret loads being coupled to different sections of the power line, and said sections being mutually isolated by turned frequency-sensitive circuitry in control of the associated section.

References Cited

UNITED STATES PATENTS

| | | | |
|---|---|---|---|
| 3,378,777 | 4/1968 | Ferrigno | 318—55 |
| 3,355,643 | 11/1967 | Benson | 318—16 |

BENJAMIN DOBECK, *Primary Examiner.*

K. L. CROSSON, *Assistant Examiner.*

U.S. Cl. X.R.

307—38; 318—16, 103, 341